US012177730B2

(12) United States Patent
Höhne et al.

(10) Patent No.: US 12,177,730 B2
(45) Date of Patent: Dec. 24, 2024

(54) ADAPTATION OF MEASUREMENT CONFIGURATION FOR NON-TERRESTRIAL NETWORKS

(71) Applicant: Nokia Technologies Oy, Espoo (FI)

(72) Inventors: Hans Thomas Höhne, Helsinki (FI); István Zsolt Kovács, Aalborg (DK); Ingo Viering, Munich (DE); Rafhael Amorim, Aalborg (DK); Mads Lauridsen, Gistrup (DK)

(73) Assignee: Nokia Technologies Oy, Espoo (FI)

( * ) Notice: Subject to any disclaimer, the term of this patent is extended or adjusted under 35 U.S.C. 154(b) by 346 days.

(21) Appl. No.: 17/636,166

(22) PCT Filed: Aug. 22, 2019

(86) PCT No.: PCT/EP2019/072457
§ 371 (c)(1),
(2) Date: Feb. 17, 2022

(87) PCT Pub. No.: WO2021/032305
PCT Pub. Date: Feb. 25, 2021

(65) Prior Publication Data
US 2022/0295359 A1 Sep. 15, 2022

(51) Int. Cl.
*H04W 36/00* (2009.01)
*H04B 7/185* (2006.01)
(Continued)

(52) U.S. Cl.
CPC .... *H04W 36/0058* (2018.08); *H04B 7/18513* (2013.01); *H04B 7/18541* (2013.01);
(Continued)

(58) Field of Classification Search
CPC ....... H04W 36/0058; H04W 36/00837; H04W 36/0094; H04W 56/0045; H04W 84/06;
(Continued)

(56) References Cited

U.S. PATENT DOCUMENTS

| 2015/0319653 | A1* | 11/2015 | Wang | H04W 36/0061 370/331 |
| 2018/0132158 | A1* | 5/2018 | Tseng | H04W 76/27 |
| 2018/0279193 | A1 | 9/2018 | Park et al. | |
| 2020/0077314 | A1* | 3/2020 | Hwang | H04W 36/30 |
| 2021/0051618 | A1* | 2/2021 | Yang | H04W 48/08 |
| 2022/0217564 | A1* | 7/2022 | van der Zee | H04W 48/16 |

FOREIGN PATENT DOCUMENTS

WO 2015/169391 A1 11/2015

OTHER PUBLICATIONS

"Report of email discussion [104#54] [NR-NTN]", 3GPP TSG-RAN WG2 Meeting #104, R2-1900547, Agenda: 11.6.4.2, Ericsson, Feb. 25-Mar. 1, 2019, 17 pages.

(Continued)

*Primary Examiner* — Ashley Shivers
(74) *Attorney, Agent, or Firm* — Barta Jones, PLLC

(57) ABSTRACT

According to an example embodiment, a client device comprises at least one processor and at least one memory including computer program code. The at least one memory and the computer program code may be configured to, with the at least one processor, cause the client device to: receive a measurement configuration from a first network node device, receive a preconfigured condition for the measurement configuration from the first network node device, and in response to the preconfigured condition for the measurement configuration being fulfilled, use the measurement configuration. A client device, a network node device, methods, and computer programs are disclosed.

14 Claims, 7 Drawing Sheets

(51) Int. Cl.
*H04W 56/00* (2009.01)
*H04W 84/06* (2009.01)

(52) U.S. Cl.
CPC . *H04W 36/00837* (2018.08); *H04W 36/0094* (2013.01); *H04W 56/0045* (2013.01); *H04W 84/06* (2013.01)

(58) Field of Classification Search
CPC .............. H04W 24/02; H04B 7/18513; H04B 7/18541; H04B 7/18504
See application file for complete search history.

(56) References Cited

OTHER PUBLICATIONS

"3rd Generation Partnership Project; Technical Specification Group Radio Access Network; NR; Radio Resource Control (RRC) protocol specification (Release 15)", 3GPP TS 38.331, V15.5.1, Apr. 2019, pp. 1-491.

Bryan et al., "JavaScript Object Notation (JSON) Patch", RFC 6902, Internet Engineering Task Force (IETF), Apr. 2013, pp. 1-18.

Invitation to Pay Additional Fees received for corresponding Patent Cooperation Treaty Application No. PCT/EP2019/072457, dated May 20, 2020, 16 pages.

"Pre-trigger based mobility for NTN", 3GPP TSG-RAN WG2 Meeting #106, R2-1910694, Agenda: 11.6.4.1.2, Nokia, Aug. 26-30, 2019, 5 pages.

"3rd Generation Partnership Project; Technical Specification Group Radio Access Network; Solutions for NR to support non-terrestrial networks (NTN) (Release 16)", 3GPP TR 38.821, V0.5.0, Apr. 2019, pp. 1-63.

"3rd Generation Partnership Project; Technical Specification Group Radio Access Network; Study on New Radio (NR) to support non-terrestrial networks (Release 15)", 3GPP TR 38.811, V15.1.0, Jun. 2019, pp. 1-126.

International Search Report and Written Opinion received for corresponding Patent Cooperation Treaty Application No. PCT/EP2019/072457, dated Jul. 13, 2020, 22 pages.

* cited by examiner

ADAPTATION OF MEASUREMENT CONFIGURATION FOR NON-TERRESTRIAL NETWORKS

RELATED APPLICATION

This application claims priority to PCT Application No. PCT/EP2019/072457, filed on Aug. 22, 2019, each of which is incorporated herein by reference in its entirety.

TECHNICAL FIELD

The present application generally relates to the field of wireless communications. In particular, the present application relates to a client device and a network node device for wireless communication, and related methods and computer programs.

BACKGROUND

Measurement gaps can be used in wireless communications technologies, such as long-term evolution (LTE) and new radio (NR) for example to allow a client device to perform measurements in neighbor cells. During measurement gaps, the client device may not be available for scheduling. Thus, unnecessary measurement gaps may decrease performance.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of a client device comprises at least one processor and at least one memory comprising computer program code. The at least one memory and the computer program code are configured to, with the at least one processor, cause the client device to: receive a measurement configuration from a first network node device; receive a preconfigured condition for the measurement configuration from the first network node device; and in response to the preconfigured condition for the measurement configuration being fulfilled, use the measurement configuration. With such configurations, the client device may, for example, start using the measurement configuration without additional signaling. This may reduce signaling overhead, since the client device may start using the measurement configuration without specific signaling when, for example, more/less frequent measurements are needed.

In an example embodiment, alternatively or in addition to the above-described example embodiments, the preconfigured condition for the measurement configuration comprises at least one of: a timer relative to a handover of the client device; a signal strength threshold value; a timing advance threshold value; a geolocation of the client device; or a signal received from the first network node device. With such configurations, the client device may, for example, start using the measurement configuration when the client device is close to a handover to another network node device.

In an example embodiment, alternatively or in addition to the above-described example embodiments, the measurement configuration comprises a measurement gap configuration and/or a measurement periodicity configuration. With such configurations, the client device may, for example, adjust the measurement gap and/or the measurement periodicity by using the measurement configuration.

In an example embodiment, alternatively or in addition to the above-described example embodiments, the at least one memory and the computer program code are further configured to, with the at least one processor, cause the client device to: receive the measurement configuration and/or the preconfigured condition for the measurement configuration in a handover command indicating a handover from a second network node device to the first network node device; and perform a handover from the second network node device to the first network node device according to the handover command. With such configurations, the client device may, for example, receive the measurement configuration and/or the preconfigured condition in the handover command, which may reduce the amount of signaling needed.

In an example embodiment, alternatively or in addition to the above-described example embodiments, the at least one memory and the computer program code are further configured to, with the at least one processor, cause the client device to: receive a reference signal from a third network node device using the measurement configuration. With such configurations, the client device may, for example, receive a reference signal in order to perform a handover to the third network node device.

An example embodiment of a client device comprises means for performing: receive a measurement configuration from a first network node device; receive a preconfigured condition for the measurement configuration from the first network node device; and in response to the preconfigured condition for the measurement configuration being fulfilled, use the measurement configuration.

An example embodiment of a method comprises: receiving a measurement configuration from a first network node device; receiving a preconfigured condition for the measurement configuration from the first network node device; and in response to the preconfigured condition for the measurement configuration being fulfilled, using the measurement configuration.

In an example embodiment, alternatively or in addition to the above-described example embodiments, the preconfigured condition for the measurement configuration comprises at least one of: a timer relative to a handover of the client device; a signal strength threshold value; a timing advance threshold value; a geolocation of the client device; or a signal received from the first network node device.

In an example embodiment, alternatively or in addition to the above-described example embodiments, the measurement configuration comprises a measurement gap configuration and/or a measurement periodicity configuration.

In an example embodiment, alternatively or in addition to the above-described example embodiments, the method further comprises receiving the measurement configuration and/or the preconfigured condition for the measurement configuration in a handover command indicating a handover from a second network node device to the first network node device; and performing a handover from the second network node device to the first network node device according to the handover command.

In an example embodiment, alternatively or in addition to the above-described example embodiments, the method further comprises receiving a reference signal from a third network node device using the measurement configuration.

An example embodiment of a computer program product comprises program code configured to perform the method according to any of the above client device related example embodiments, when the computer program product is executed on a computer.

An example embodiment of a network node device comprises at least one processor and at least one memory comprising computer program code. The at least one memory and the computer program code are configured to, with the at least one processor, cause the network node device to: receive an information related to a client device and a second network node device; based on the information related to a client device and a second network node device, determine a measurement configuration and a preconfigured condition for the measurement configuration; transmit the measurement configuration and the preconfigured condition for the measurement configuration to the client device. With such configurations, the network node device may, for example, indicate to the client device the measurement configuration and condition for starting to use the measurement configuration. Thus, the client device may start to use the measurement configuration without additional signaling.

In an example embodiment, alternatively or in addition to the above-described example embodiments, the at least one memory and the computer program code are further configured to, with the at least one processor, cause the network node device to: in response to the preconfigured condition for the measurement configuration being fulfilled, use the measurement configuration. With such configurations, the network node device may, for example, start to use the measurement configuration at the same time with the client device without additional signaling.

In an example embodiment, alternatively or in addition to the above-described example embodiments, the at least one memory and the computer program code are further configured to, with the at least one processor, cause the network node device to: in response to the preconfigured condition for the measurement configuration being fulfilled, adjust scheduling of the client device in accordance with the measurement configuration. With such configurations, the network node device may, for example, adjust scheduling so that the client device may perform measurements according to the measurement configurations without additional signaling.

In an example embodiment, alternatively or in addition to the above-described example embodiments, the at least one memory and the computer program code are further configured to, with the at least one processor, cause the network node device to: receive the information related to the client device and the second network node device from the client device or from the second network node device. With such configurations, the network node device may, for example, receive the information from the client device or the second network node device.

In an example embodiment, alternatively or in addition to the above-described example embodiments, the information related to the client device and the second network node device comprises at least one of: length of stay of the client device; at least one beam used between the client device and the second network node device; at least one beam geometry used between the client device and the second network node device; a mobility profile of the client device; or a location of the client device. With such configurations, the network node device may, for example, efficiently determine the measurement configuration and/or the preconfigured condition from the information.

In an example embodiment, alternatively or in addition to the above-described example embodiments, the at least one memory and the computer program code are further configured to, with the at least one processor, cause the network node device to: transmit the measurement configuration and/or the preconfigured condition to the client device via the second network node device. With such configurations, the network node device may, for example, transmit the measurement configuration and/or the preconfigured condition to the client device even in situation where the second network node device is a serving node of the client device.

In an example embodiment, alternatively or in addition to the above-described example embodiments, the at least one memory and the computer program code are further configured to, with the at least one processor, cause the network node device to: transmit the measurement configuration and/or the preconfigured condition to the client device in a handover command indicating a handover from the second network node device to the network node device. With such configurations, the network node device may, for example, transmit the measurement configuration and/or the preconfigured condition to the client device in the handover command without needing additional signaling.

An example embodiment of a network node device comprises means for performing: receive an information related to a client device and a second network node device; based on the information related to a client device and a second network node device, determine a measurement configuration and a preconfigured condition for the measurement configuration; transmit the measurement configuration and the preconfigured condition for the measurement configuration to the client device.

An example embodiment of a method comprises: receiving an information related to a client device and a second network node device; based on the information related to a client device and a second network node device, determining a measurement configuration and a preconfigured condition for the measurement configuration; transmitting the measurement configuration and the preconfigured condition for the measurement configuration to the client device.

In an example embodiment, alternatively or in addition to the above-described example embodiments, the method further comprises, in response to the preconfigured condition for the measurement configuration being fulfilled, using the measurement configuration.

In an example embodiment, alternatively or in addition to the above-described example embodiments, the method further comprises, in response to the preconfigured condition for the measurement configuration being fulfilled, adjusting scheduling of the client device in accordance with the measurement configuration.

In an example embodiment, alternatively or in addition to the above-described example embodiments, the method further comprises receiving the information related to the client device and the second network node device from the client device or from the second network node device.

In an example embodiment, alternatively or in addition to the above-described example embodiments, the information related to the client device and the second network node device comprises at least one of: length of stay of the client device; at least one beam used between the client device and the second network node device; at least one beam geometry used between the client device and the second network node device; a mobility profile of the client device; or a location of the client device.

In an example embodiment, alternatively or in addition to the above-described example embodiments, the method further comprises, transmitting the measurement configuration and/or the preconfigured condition to the client device via the second network node device.

In an example embodiment, alternatively or in addition to the above-described example embodiments, the method further comprises transmitting the measurement configuration and/or the preconfigured condition to the client device in a handover command indicating a handover from the second network node device to the network node device.

An example embodiment of a computer program product comprises program code configured to perform the method according to any of the above network node device related example embodiments, when the computer program product is executed on a computer.

DESCRIPTION OF THE DRAWINGS

The accompanying drawings, which are included to provide a further understanding of the example embodiments and constitute a part of this specification, illustrate example embodiments and together with the description help to explain the principles of the example embodiments. In the drawings.

Like reference numerals are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present disclosure may be constructed or utilized. The description sets forth the functions of the example and the sequence of steps for constructing and operating the example. However, the same or equivalent functions and sequences may be accomplished by different example embodiments.

According to an example embodiment, a client device comprises at least one processor and at least one memory including computer program code. The at least one memory and the computer program code configured to, with the at least one processor, cause the client device to receive a measurement configuration from a first network node device; receive a preconfigured condition for the measurement configuration from the first network node device; and in response to the preconfigured condition for the measurement configuration being fulfilled, use the measurement configuration.

At least some of the embodiments described herein may enable the client device to adjust the measurement configuration with reduced radio resource control (RRC) signaling. This may be useful, for example, in relation to handovers of the client device from one non-terrestrial network node device to another. Close to a handover, an increased number of measurements may be beneficial, while unnecessary measurements may reduce performance.

Figure 1:
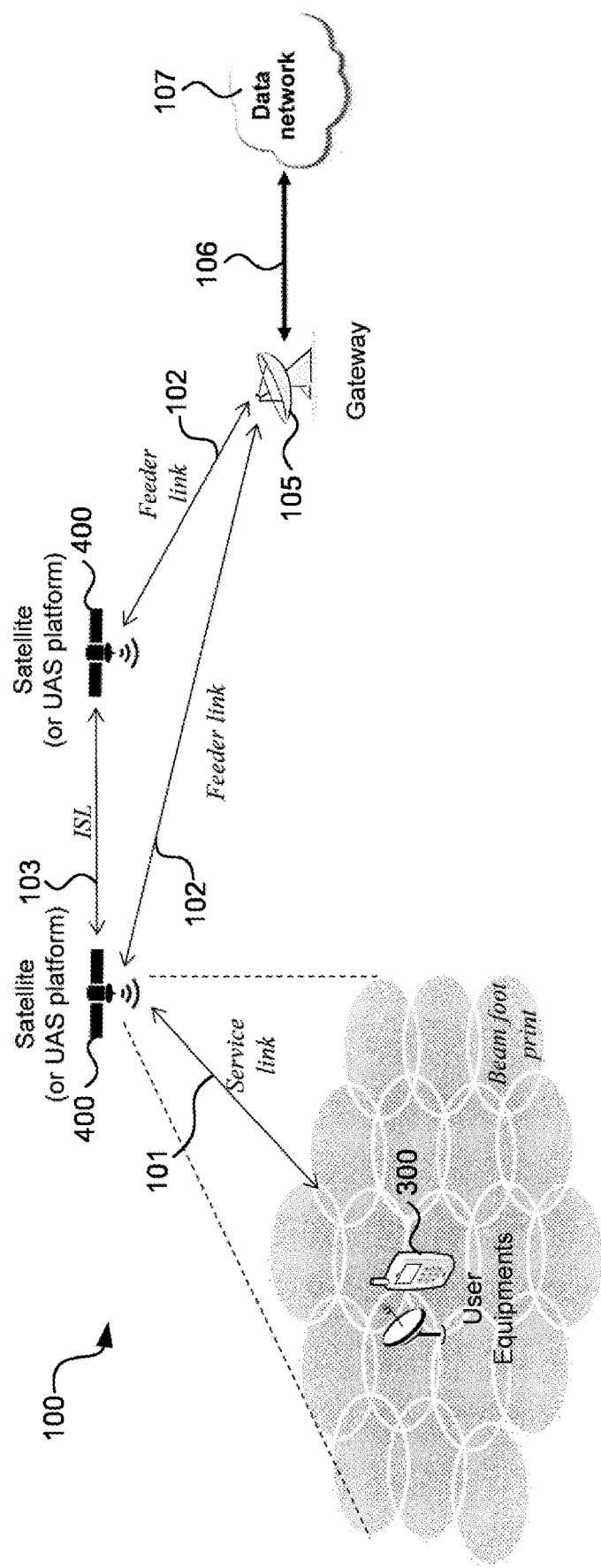
FIG. 1 illustrates an example embodiment of the subject matter described herein illustrating an example system, where various example embodiments of the present disclosure may be implemented.

FIG. 1 illustrates an example system 100, where various example embodiments of the present disclosure may be implemented. An example representation of the system 100 is shown depicting a client device 300, and two network node devices 400.

The system 100 may comprise a non-terrestrial network (NTN). An example representation of the system 100 is shown depicting a client device 300, a network node device 400, a gateway 105, as well as a data network 107. The network node device 400 may correspond to a satellite. Two network node devices may communicate via an intersatellite link (ISL) 103. The network node devices 400 may communicate with the gateway 105 via a feeder link 102. There may be a link connection 106 between the gateway 105 and data network 107. The network node device 210 may access the data network 106 via the feeder link 102, the gateway 101, and/or the link connection 105 between the gateway 101 and the data network 106.

The client device 200 may include e.g. a mobile phone, a smartphone, a tablet computer, a smart watch, or any handheld or portable device. The client device 200 may also be referred to as a user equipment. The client device 200 may communicate with the network node device 210 via a service link 103.

Regenerative satellites may refer to satellite which comprise a network node device 400 on-board a satellite. The regenerative satellite scenarios also include cases when the DU-gNB or when IAB/relay is on-board the satellite.

In NTN communications a satellite carrying a gNB (regenerative payload) may communicate with ground-based client devices 300 via the Uu interface. That is the access link may be a Uu interface. Likewise, the gNB may be connected to a gateway on the ground via a Xn interface, a NG interface, or a Uu interface, depending on the architecture solution.

As the low earth orbit (LEO) satellite-gNBs coverage are traversing a geo-area, client devices 300 on the ground may need to measure their cells which are likely to be on different carrier frequencies to avoid mutual interference (frequency re-use patterns are typically used in satellite communications and have been also proposed for NTN as baseline). Some intra-frequency measurements could also need measurement gaps, not because of retuning but because the client device may not be able to handle normal reception and measuring something. Or because subcarrier spacing (SCS) or bandwidth (BW) is different. It may be necessary to configure the client devices 300 with such measurements. Further, the client device's measurements for non-serving carrier frequencies and in some cases for intra-frequency carriers can comprise measurement gaps. In a measurement gap, the client device is, for example, busy switching its RF circuitry to a different frequency or BW or SCS and carrying out measurements of a neighbor cell. During this period, the client device is not expected to receive or transmit from or to its serving network node device. Thus, measurement gaps may impact performance.

The transition of network node devices and their cells can be rather deterministic. In order to reduce the amount of measurements to be carried out by client devices 300, and the amount of measurement gaps, one may reconfigure a client device 300 to carry out less measurements and measurement gaps when the current cell is well in view, and more measurements for the next expected cell when the serving cell is transitioning away from the client device.

This kind of reconfiguration may be regarded beneficial, as new neighboring cells may have different frequencies, and in part as an optimization that is saving client device measurement gaps at the expense of radio resource control (RRC) signaling.

A unilateral (autonomous) configuration of measurements at the client device 300 may not be possible as the network node device 400 and the client device 300 may need to have the same understanding of measurement gaps.

The client device 300 may include e.g. a mobile phone, a smartphone, a tablet computer, a smart watch, or any handheld or portable device or any other apparatus, such as a vehicle, a robot, or a repeater. The client device 300 may also be referred to as a user equipment (UE). The client device 300 may communicate with the network node device 400 via e.g. an air/space born vehicle communication connection, such as a service link.

Network node device 400 may be referred to as serving network node device. Network node device 220 may be referred to as neighboring network node device 220. The serving network node device 400 may communicate with the client device 300 via a serving cell. The neighboring network node device 220 may serve other client devices via a neighboring cell 240. The terms "serving" and "neighboring" may only refer to which network node device and/or cell provides network connectivity to the client device 300.

Measurement gaps can be used in wireless communications technologies, such as long-term evolution (LTE) and new radio (NR), to allow a client device 300 to perform measurements in neighboring cells 240. Measurement gaps can be particularly interesting for inter-frequency or inter radio access technology (RAT) measurements, since it might become very expensive for the client device 400 to be capable of measuring in different frequencies or RATs simultaneously. Additionally, during measurement gaps, the client device 400 may not be available for scheduling. That is it may not be able to send or not receive or neither. To make this work, the configuration of measurement gaps should be an agreement between the serving network node device 400 and the client device 300. In NR, the network node device 400 may configure a measurement gap for client devices 300 by configuring the MeasGapConfig information element in the RRC Connection Reconfiguration message. These configurations assume that the discovery reference signals (DRS) are periodic, and their occurrence is at least partially overlapped with the measurement gap configuration.

Some terminology used herein may follow the naming scheme of 4G or 5G technology in its current form. However, this terminology should not be considered limiting, and the terminology may change over time. Thus, the following discussion regarding any example embodiment may also apply to other technologies.

Figure 2:
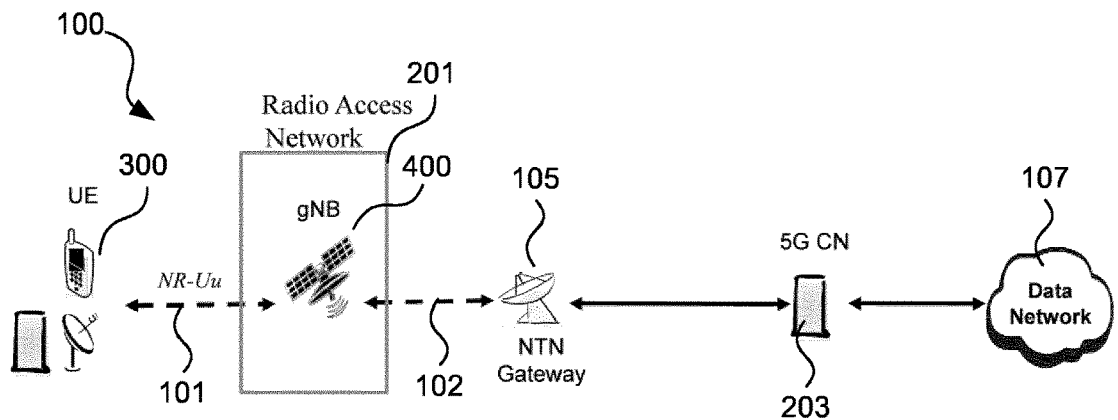
FIG. 2 illustrates an example embodiment of the subject matter described herein illustrating an example system, where various example embodiments of the present disclosure may be implemented.

FIG. 2 illustrates an example embodiment of a system 100.

The client device 300 may communicate with the network node device 400 in the radio access network 201 via a Uu interface 101. The network node device 400 may communicate with the gateway 105 via a feeder link 102. The gateway 105 may communicate with a 5G core network 203 using, for example, an NG interface. The 5G core network 203 may communicate with a data network 107 using, for example, an N6 interface.

Figure 3:
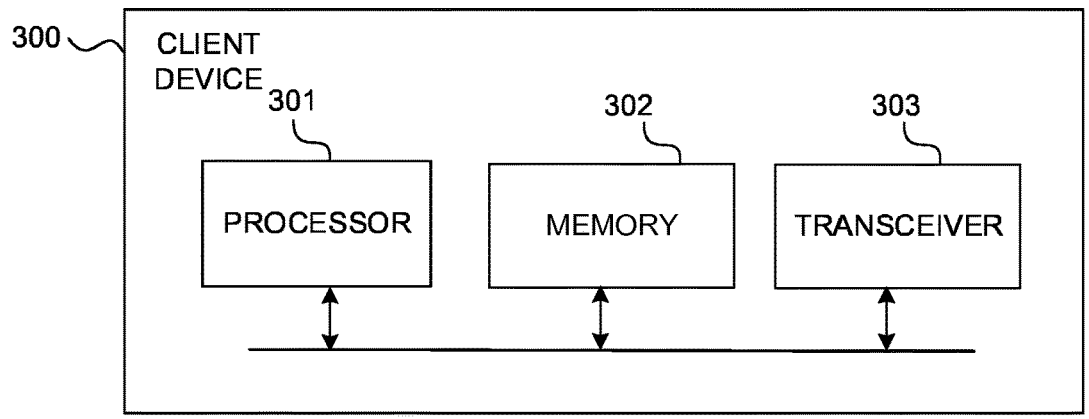
FIG. 3 illustrates an example embodiment of the subject matter described herein illustrating a client device.

FIG. 3 is a block diagram of a client device 300 configured in accordance with an example embodiment.

The client device 300 comprises one or more processors 301, and one or more memories 302 that comprise computer program code. The client device 300 may also comprise a transceiver 303, as well as other elements, such as an input/output module (not shown in FIG. 3), and/or a communication interface (not shown in FIG. 3).

According to an example embodiment, the at least one memory 302 and the computer program code are configured to, with the at least one processor 301, cause the client device 300 to: receive a measurement configuration from a first network node device; receive a preconfigured condition for the measurement configuration from the first network node device; in response to the preconfigured condition for the measurement configuration being fulfilled, use the measurement configuration.

The measurement configuration of the client device 300 may be adjusted according to the transition of a non-terrestrial network node device 400.

When the quality (e.g. RSRP) of a serving network node device 400 is increasing for the client device 300, the client device 300 may reduce the measurement periodicity and/or measurement gaps for neighboring cells on different carrier frequencies.

When the next target non-terrestrial network node device is expected to come into view, the client device 300 may increase measurement periodicity and/or required gaps.

The serving network node device 400 may modify the measurement gaps, and the client device 300 may change the measurement configuration simultaneously, but without the exhaustive signaling.

Several measurement configurations (or aspects thereof, such as measurement gap length, or measurement periodicity) may be preconfigured, and put into use according to a timer following a HO, following a TA development, or explicit signaling.

Although the client device 300 may be depicted to comprise only one processor 301, the client device 300 may comprise more processors. In an example embodiment, the memory 302 is capable of storing instructions, such as an operating system and/or various applications.

Furthermore, the processor 301 is capable of executing the stored instructions. In an example embodiment, the processor 301 may be embodied as a multi-core processor, a single core processor, or a combination of one or more multi-core processors and one or more single core processors. For example, the processor 301 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the processor 301 may be configured to execute hard-coded functionality. In an example embodiment, the processor 301 is embodied as an executor of software instructions, wherein the instructions may specifically configure the processor 301 to perform the algorithms and/or operations described herein when the instructions are executed.

The memory 302 may be embodied as one or more volatile memory devices, one or more non-volatile memory devices, and/or a combination of one or more volatile memory devices and non-volatile memory devices. For example, the memory 302 may be embodied as semiconductor memories (such as mask ROM, PROM (programmable ROM), EPROM (erasable PROM), flash ROM, RAM (random access memory), etc.).

The client device 300 may be any of various types of devices used directly by an end user entity and capable of communication in a wireless network, such as user equipment (UE). Such devices include but are not limited to smartphones, tablet computers, smart watches, lap top computers, Internet-of-Things (IoT) devices, etc.

Figure 4:
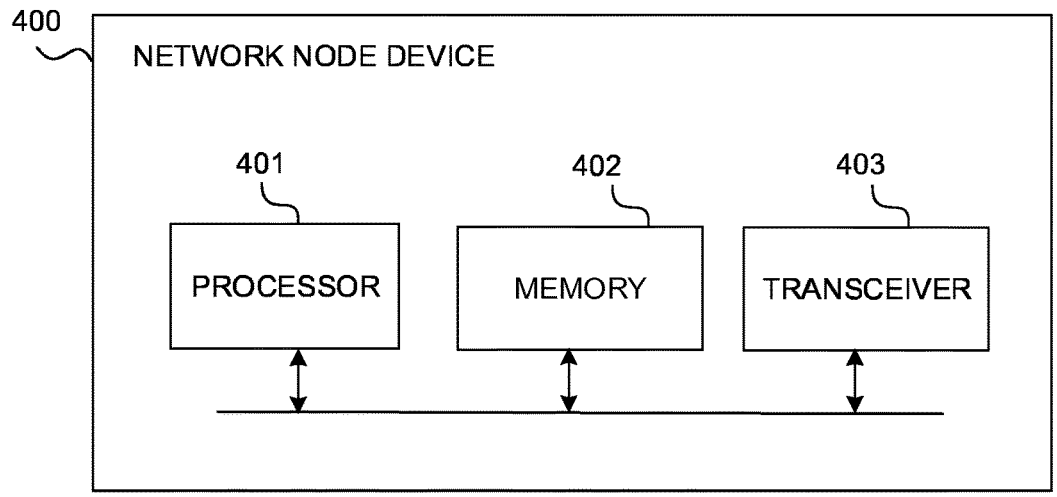
FIG. 4 illustrates an example embodiment of the subject matter described herein illustrating a network node device.

FIG. 4 is a block diagram of a network node device 400 in accordance with an example embodiment.

The network node device 400 comprises one or more processors 401, and one or more memories 402 that comprise computer program code. The network node device 400 may also comprise a transceiver 403, as well as other elements, such as an input/output module (not shown in FIG. 4), and/or a communication interface (not shown in FIG. 4).

According to an example embodiment, the at least one memory 402 and the computer program code are configured to, with the at least one processor 401, cause the network node device 400 to: receive an information related to a client device 300 and a second network node device; based on the information related to a client device 300 and a second network node device, determine a measurement configuration and a preconfigured condition for the measurement configuration; and transmit the measurement configuration and the preconfigured condition for the measurement configuration to the client device 300.

Although the network node device 400 is depicted to comprise only one processor 401, the network node device 400 may comprise more processors. In an example embodiment, the memory 402 is capable of storing instructions, such as an operating system and/or various applications.

Furthermore, the processor 401 is capable of executing the stored instructions. In an example embodiment, the processor 401 may be embodied as a multi-core processor, a single core processor, or a combination of one or more multi-core processors and one or more single core processors. For example, the processor 401 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the processor 401 may be configured to execute hard-coded functionality. In an example embodiment, the processor 401 is embodied as an executor of software instructions, wherein the instructions may specifically configure the processor 401 to perform the algorithms and/or operations described herein when the instructions are executed.

The memory 402 may be embodied as one or more volatile memory devices, one or more non-volatile memory devices, and/or a combination of one or more volatile memory devices and non-volatile memory devices. For example, the memory 402 may be embodied as semiconductor memories (such as mask ROM, PROM (programmable ROM), EPROM (erasable PROM), flash ROM, RAM (random access memory), etc.).

The network node device 400 may be a base station. The base station may comprise, for example, a fifth-generation base station (gNB) or any such device providing an air interface for client devices 300 to connect to the wireless network via wireless transmissions.

The network node device 400 may also be referred to as non-terrestrial network node device, base station, a gNB, a satellite-gNB, satellite, or similar. In some cases, the satellite may be a transparent satellite while the gNB is located on the earth. In that case the gNB can be considered the network node. A transparent satellite will serve as a conduit for UL and DL signals while performing possibly frequency translation and amplification, and other signal processing, while being in general not aware of the signal contents that it is relaying.

Further features of the network node device 400 directly result from the functionalities and parameters of the client device 300.

Figure 5:
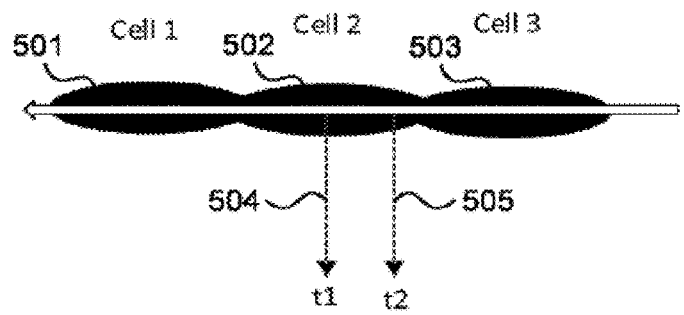
FIG. 5 illustrates an example embodiment of the subject matter described herein illustrating a transition of a non-terrestrial network node device.

FIG. 5 illustrates an example embodiment of a transition of a non-terrestrial network node device. As the network node device moves on orbit, the cells 501, 502, 503 move on the surface of the earth. If a client device 300 is close to the middle of cell 2 502 at time instant t1 504, it may be beneficial for the client device 300 perform measurements more seldom. On the other hand, as the network node device moves, at some later time instant t2 505, the client device 300 may be close to the edge/boundary of cell 2 502. At this time, it may be beneficial for the client device 300 to perform measurements more frequently in order to measure frequencies of cell 3 503.

Figure 6:
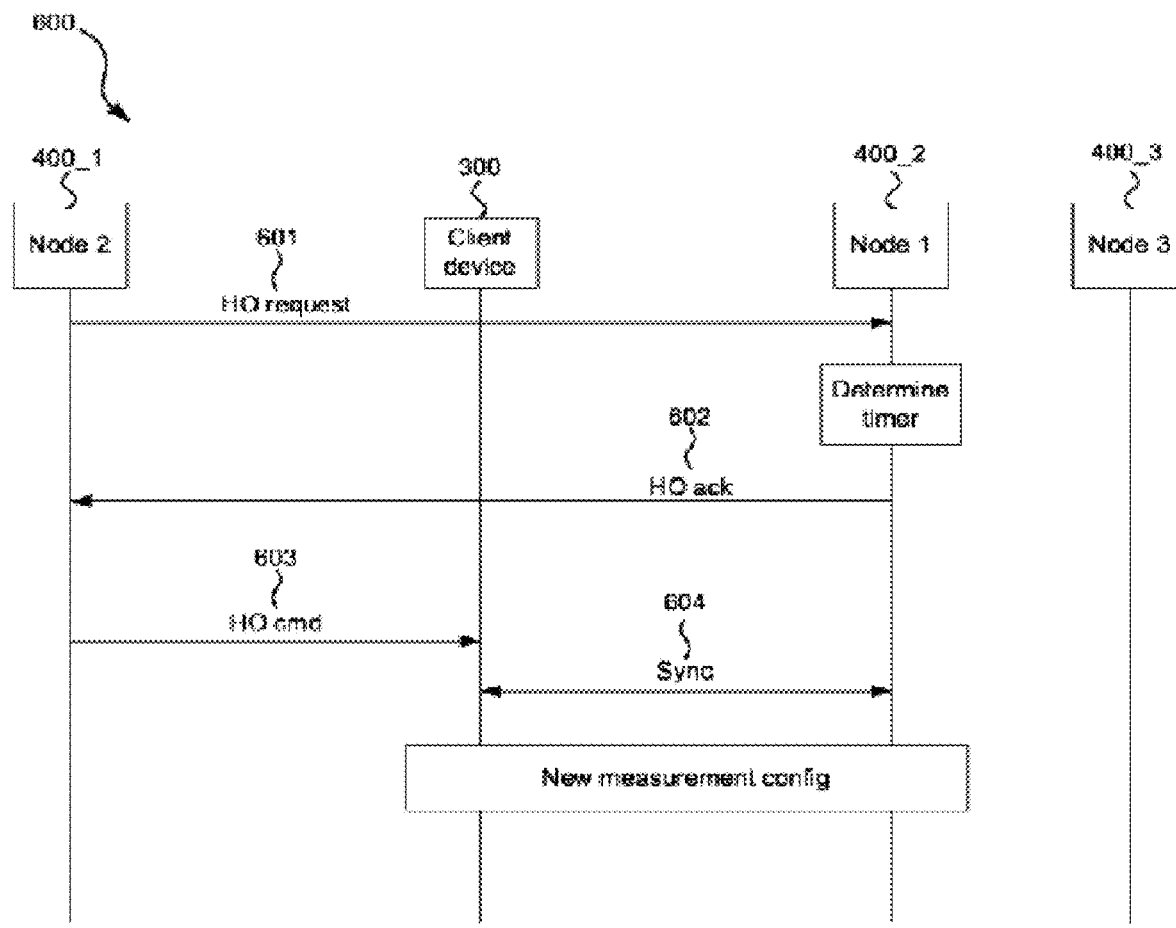
FIG. 6 illustrates another example embodiment of the subject matter described herein illustrating a signaling diagram.

FIG. 6 illustrates an example embodiment of a signaling diagram 600.

According to an example embodiment, a first network node device 400_2 may receive an information related to a client device 300 and a second network node device 400_1. The information may be transmitted by, for example, the second network node device 400_1. The information may be related to a connection between the client device 300 and the first network node device 400_2. For example, the first network node device 400_2 may be a serving base station of the client device 300.

The first network node device 400_2 may receive the information related to the client device 300 and the second network node device 400_1 from the client device 300 or from the second network node device 400_1. The information may be for instance signaled as part of the HO request 601.

The information may comprise, for example, a length of stay of the client device 300. The length of stay of the client device 300 may indicate, for example, how long the client device 300 has been connected to the second network node device 400_1 and/or to the cells of the second network node device 400_1.

The information may comprise, for example, at least one beam used between the client device 300 and the second network node device 400_1.

The information may comprise, for example, at least one beam geometry used between the client device 300 and the second network node device 400_1.

The information may comprise, for example, a mobility profile of the client device 300.

The information may comprise, for example, a location of the client device 300.

The second network node device 400_1 may transmit the information in, for example, a handover request 601.

A second network node device 400_1 may transmit a handover (HO) request 601 to a first network node device 400_2. The HO request may indicate that the client device 300 should be handed over from the second network node device 400_1 to the first network node device 400_2. The HO request may comprise at least one of: the length of stay, the beam or the beams used, beam geometry, mobility profile of the client device 300, or client device location.

The first network node device 400_2 may determine from the above received information how long the client device is likely to stay in the coverage of the first network node device 400_2 and when it will need to prepare a new HO to a third network node device 400_3.

The first network node device 400_2 may, based on the information related to the client device 300 and the second network node device 400_1, determine a measurement configuration and a preconfigured condition for the measurement configuration. The measurement configuration and a preconfigured condition for the measurement configuration may be referred to as a timed measurement configuration. The measurement configuration may determine the configuration and the preconfigured condition may determine the timing when the configuration should be used. The preconfigured condition for the measurement configuration may also be referred to as a trigger or similar.

The measurement configuration may also be referred to as a new measurement configuration or as an updated measurement configuration. The client device 300 may, for example, be configured with a default or initial measurement configuration. In response to the preconfigured condition for the measurement configuration being fulfilled, the client device 300 may switch from the default/initial measurement configuration to the new/updated measurement configuration.

The preconfigured condition for the measurement configuration may comprise at least one of: a timer relative to a handover of the client device 300; a signal strength threshold value; a timing advance threshold value; a geolocation of the client device 300; or a signal received from the first network node device. For example, the timer relative to a handover of the client device 300 may indicate that the client device 300 should use the measurement configuration a preconfigured time interval after a handover of the client device 300 from the second network node device 400_1 to the first network node device 400_2 has been performed.

The signal strength threshold value may be, for example, a threshold value for a signal transmitted by a serving network node device 400 of the client device 300. The serving network node device may be, for example, the first network node device 400_2. The signal received from the first network node device 400_2 may be an explicit signal transmitted by the first network node device 400_2. For example, the preconfigured condition may comprise a reference signal received power (RSRP) threshold. When the signal quality of a serving network node device (such as the first network node device 400_2) is increasing for the client device 300, the client device 300 may decrease measurement periodicity and measurement gaps for neighboring cells on different carrier frequencies.

The geolocation of the client device 300 may comprise, for example, a global navigation satellite system (GNSS) or a radio access network (RAN) based location information of the client device 300.

The first network node device 400_2 may transmit the measurement configuration and the preconfigured condition for the measurement configuration to the client device 300. The first network node device 400_2 may transmit the measurement configuration and the preconfigured condition for the measurement configuration to the client device 300 directly or via some other device, such as the second network node device 400_1.

The first network node device 400_2 may transmit the measurement configuration and/or the preconfigured condition to the client device 300 in a handover command indicating a handover from the second network node device 400_1 to the first network node device 400_2.

The first network node device 400_2 may transmit the measurement configuration and the preconfigured condition for the measurement configuration to the client device 300 via, for example, the second network node device 400_1. For example, the first network node device 400_2 may transmit a HO acknowledgement 602 to the second network node device 400_1. The HO acknowledgement 602 may comprise the measurement configuration and the preconfigured condition for the measurement configuration.

The measurement configuration may comprise, for example, a measurement gap configuration and/or a measurement periodicity configuration. The measurement gap configuration may comprise, for example, a measurement gap length, a measurement gap periodicity, and/or a measurement gap offset.

The first network node device 400_2 may provide the information about timed measurement configuration in a HO acknowledgement 602 to the second network node device 400_1. The information about timed measurement configuration may be, for example, part of a HO command in the HO acknowledgement 602.

The second network node device 400_1 may transmit the HO command 603 to the client device 300.

The client device 300 may receive the measurement configuration and/or the preconfigured condition for the measurement configuration in a handover command 603 indicating a handover from a second network node device 400_1 to the first network node device 400_2. The client device 300 may perform a handover from the second network node device 400_1 to the first network node device 400_2 according to the handover command 603.

Once the handover is completed (after signaling 604), the RRC configuration comprising also the measurement configuration contained in the HO cmd 603 can be taken into use by the client device 300.

Or, a measurement configuration can be provided in 702.

The client device 300 may synchronize 604 with the first network node device 400_2 for example as part of the random access channel (RACH) process.

The client device 300 may, in response to the preconfigured condition for the measurement configuration being fulfilled, use the measurement configuration.

The first network node device 400_2 may, in response to the preconfigured condition for the measurement configuration being fulfilled, use the measurement configuration. The first network node device 400_2 may, for example, in response to the preconfigured condition for the measurement configuration being fulfilled, adjust scheduling of the client device 300 in accordance with the measurement configuration.

The measurement configuration may contain an updated configuration that is activated when a condition is met.

In one example embodiment, timers relative to the HO, such as relative to the HO complete (that is relative the Sync message exchange 604 being completed), will, when elapsed, cause the client device 300 and the first network node device 400_2 to take into used the updated measurement configuration.

When the timers related to the HO have elapsed, and the client device 300 and the first network node device 400_2 can take into use the updated measurement configuration.

The client device 300 may receive a reference signal from a third network node device 400_3 using the measurement configuration. The client device 300 may, for example, measure reference signals transmitted by the third network node device 400_3. The client device 300 may use the measurements in order to perform a further HO from the first network node device 400_2 to the third network node device 400_3.

The information exchange illustrated in the example embodiment of FIG. 6 can also happen in different orders. Some of these are illustrated in the example embodiments herein.

The client device 300 and/or the first network node device 400_2 may use a single timer to take the measurement configuration into use. However, the client device 300 and/or the first network node device 400_2 may also use more complex profiles. For instance, several timers can be started at the time of the HO. For example, following a HO at time instant $t_0$, at $t_0+d_1$ the number of measurements can be reduced, and at $t_0+d_2$ the number of measurements can be increased.

It should be appreciated that the time of stay of the client device 300 in a cell can be influenced by the width or footprint of the satellite's beam on earth. This width, or more generally the geometry may be also considered when setting the timers. For instance, if the client device 300 had a time of stay of T seconds in the previous beam of the second network node device 400_1, and the target beam of the first network node device 400_2 is twice as wide, a time of stay of 2T can be anticipated. Thus, the first network node device 400_2 may adjust the preconfigured condition for the measurement configuration accordingly.

The timer start time as well as the determination of the length of stay in a cell may be also normalized or be relating with respect to, for example, reaching a threshold, or timing advance (TA). For instance, the length of stay calculation may be set in relation to reaching the HO event, such as the A3 event.

Herein, terms such as "first network node device", "second network node device", and "third network node device" may be used to only describe relative functionality of network node devices. Any network node device 400 disclosed herein may be configured to implement the functionality of another network node device 400 regardless of the exact naming used for these devices.

Figure 7:
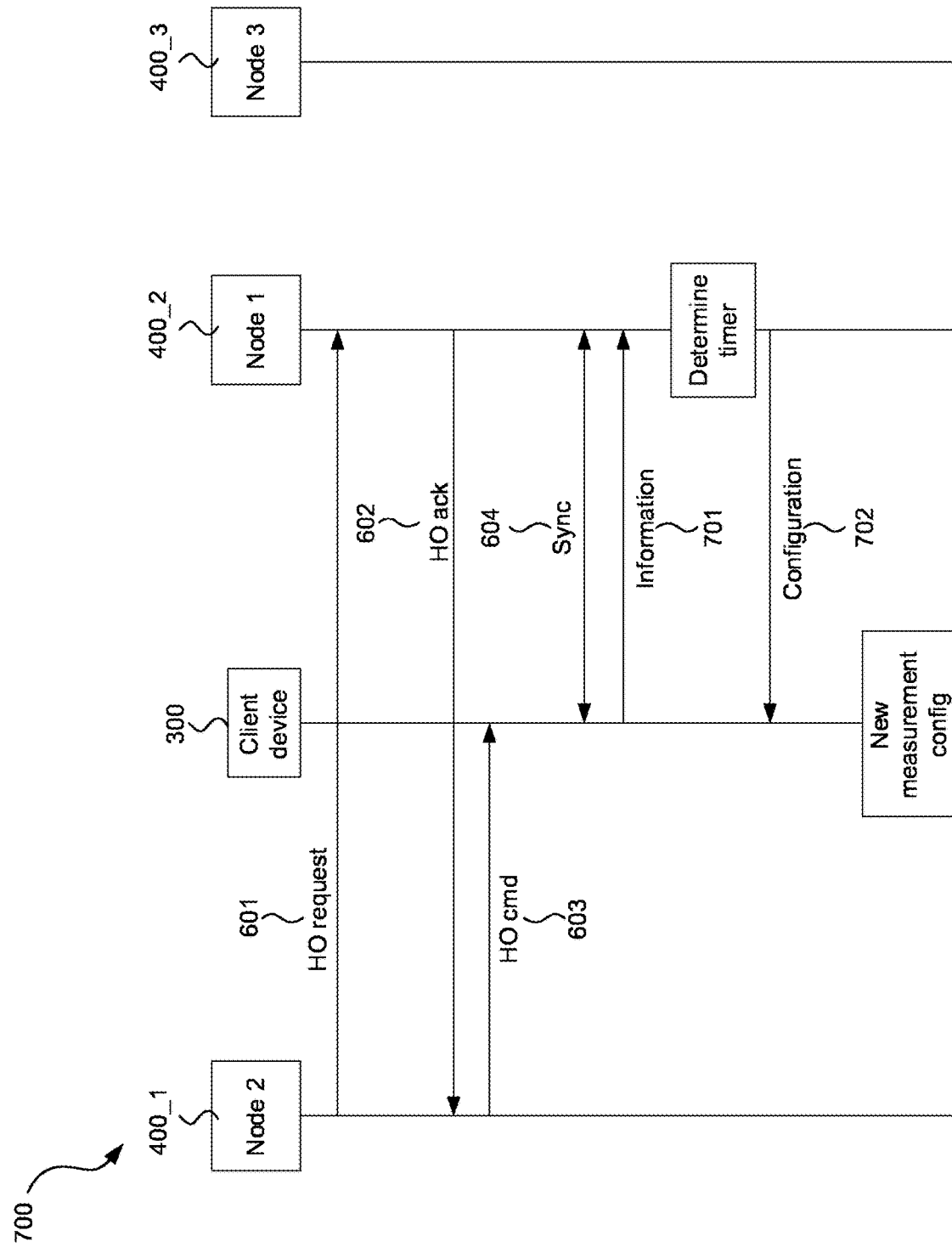
FIG. 7 illustrates another example embodiment of the subject matter described herein illustrating a signaling diagram.

FIG. 7 illustrates an example embodiment of a signaling diagram 700. Any disclosure herein in relation to the example embodiment of FIG. 6 may also apply to the example embodiment of FIG. 7.

In some example embodiments, the client device 300 may provide the information 701 to the first network node device 400_2. The client device 300 may provide the information, for example, after the HO.

The first network node device 400_2 may transmit the measurement configuration 702 and/or the preconfigured condition for the measurement configuration to the client device 300. The first network node device 400_2 may transmit the measurement configuration 702 and/or the preconfigured condition for the measurement configuration, for example, directly to the client device 300 instead of transmitting them via the second network node device 400_1 as illustrated in the example embodiment of FIG. 6.

Figure 8:
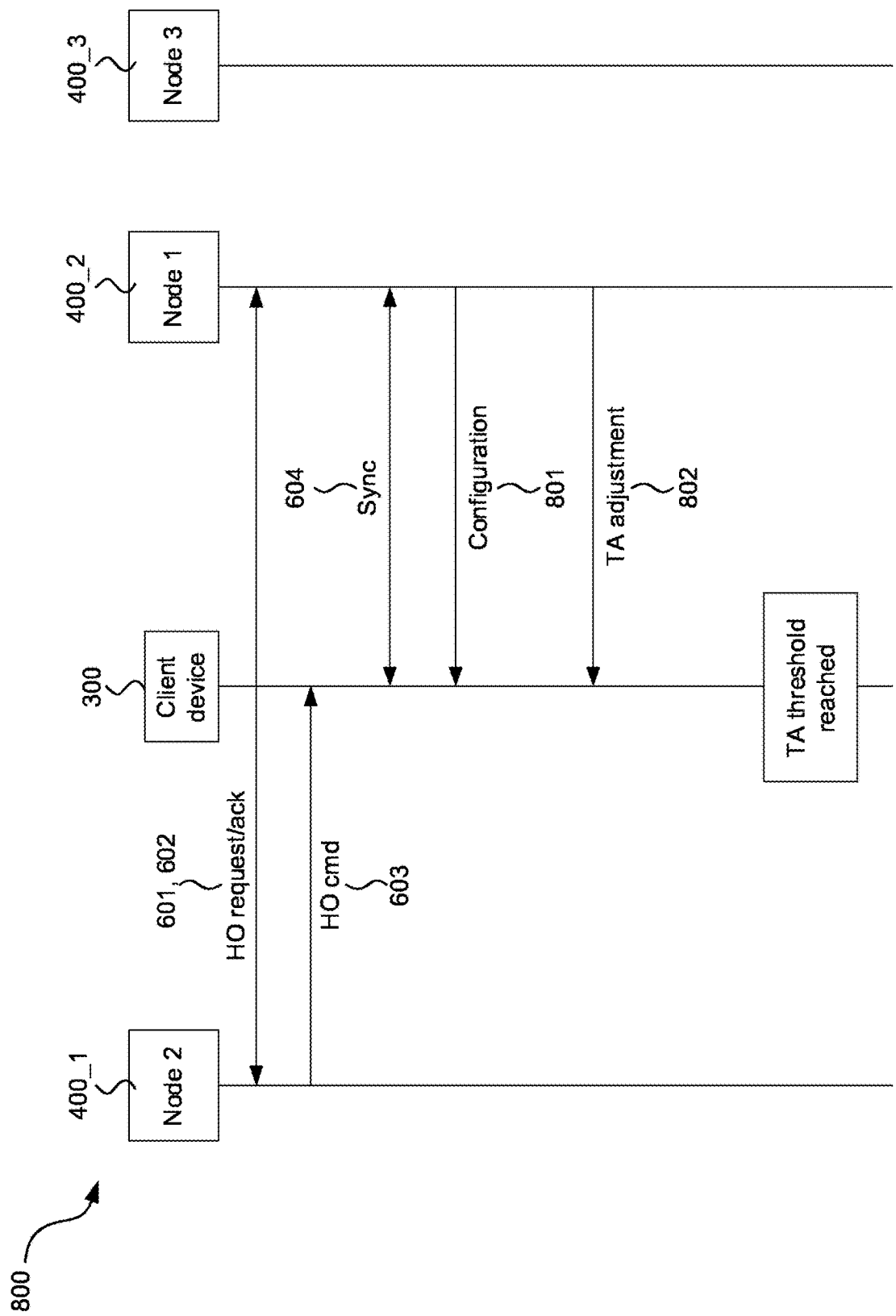
FIG. 8 illustrates another example embodiment of the subject matter described herein illustrating a signaling diagram.

FIG. 8 illustrates an example embodiment of a signaling diagram 800. Any disclosure herein in relation to the example embodiments of FIG. 6 or FIG. 7 may also apply to the example embodiment of FIG. 8.

As in the example embodiments of FIG. 6 and FIG. 7, the first network node device 400_2 can be made aware during or immediately after the HO of the previous stay duration of the client device 300, geolocation, used beams/beam HO sequence in the second network node device 400_1 etc.

In some example embodiments, the first network node device 400_2 may also learn what has been the TA trace of the client device 300 in the second network node device 400_1. This may enable the first network node device 400_2 to deduce an optimized measurement and/or reporting schedule based on the TA for the client device 300.

The first network node device 400_2 can configure a TA based measurement configuration 801 to the client device 300. For example, the preconfigured condition for the measurement configuration may comprise a TA threshold value. The preconfigured condition may further indicate that the client device 300 should use the measurement configuration when the TA is below or above the TA threshold value.

When the first network node device 400_2 provides a new TA $T_i$ in a TA adjustment 802 to the client device 300 for instance in system frame number (SFN) X, and that TA reaches the preconfigured threshold, the client device 300 can take into use the measurement configuration that was configured to correspond to $T_i$ at instance SFN X+Δ. The parameter Δ may be assumed to be known by the client device 300 and the first network node device 400_2.

Figures 9, 10:
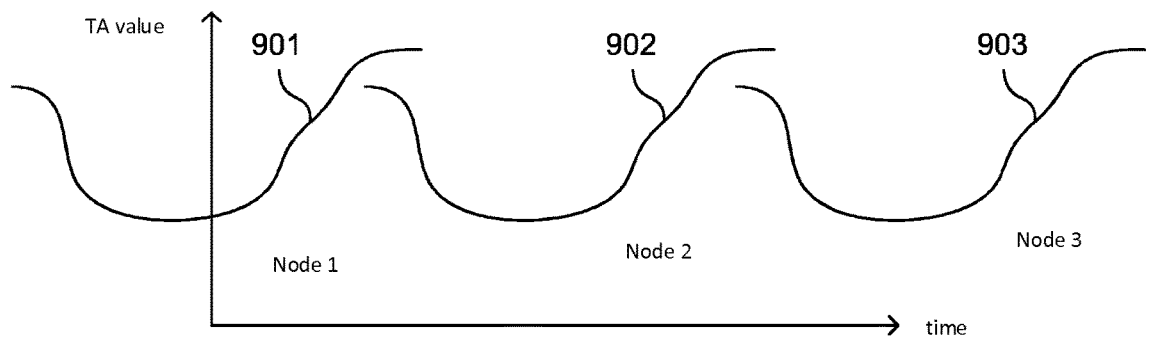
FIG. 9 illustrates another example embodiment of the subject matter described herein illustrating timing advance values.
FIG. 10 illustrates another example embodiment of the subject matter described herein illustrating measurement configuration.

FIG. 9 shows an example embodiment of the subject matter described herein illustrating timing advance values.

The preconfigured condition for the measurement configuration may comprise single specific TA threshold value. However, the preconfigured condition for the measurement configuration may also comprise more advanced TA profiles.

For instance, after a HO, the TA may be large, then decrease as the network node device 400 passes over the client device 300 or the client device 300 passes the network node device 400. The TA may then increase again as the next network node device 400 comes into view. An example embodiment of such TAs 901-903 is illustrated in in FIG. 9 for three network node devices. Thus, the measurement configuration may also be adjusted according to whether the (filtered) TA is rising or falling. For example, the preconfigured condition for the measurement configuration may indicate that the client device 300 should use the measurement configuration when the TA starts increasing or when the TA starts decreasing.

In some example embodiments, a single network node device 400 may employ different cells with frequency reuse or band partitioning, requiring then an intra-satellite HO.

The same schemes disclosed herein may apply in such a case. In such cases, a single cell's TA profile can be a segment of the profiles in the example embodiment of FIG. 9. Then the network node device 400 may signal the interval of admissible TAs in a given cell, such that the client device 300 knows when its approaching one of its borders.

FIG. 10 illustrates an example embodiment of a measurement configuration.

For example, the network node device 400 may provide the client device 300 with two measurement configurations cfg1 and cfg2. The client device 300 may take cfg1 into use immediately. When the condition for activating the other configuration is reached, the client device 300 may deactivate cfg1 and activate cfg2.

In the same way the network node device 400 may provide multiple measurement configurations at the same time, with a different validity periods. For example, a coarse measurement configuration may be applied after, for example, 4.5 minutes (and before 5.5 minutes). A finer granularity measurement configuration may be applied after, for example, 5.5 minutes. The network node device 400 may also provide to the served client devices 300 a list of measurement configurations at the early stage, and the network node device 400 can change from one entry to the next entry in the list by sending a simple and small trigger ("next entry").

It may also be possible to provide multiple configurations of sub-aspects of the overall measConfig. In the measConfig in particular the measurement gap (measGapConfig) 1004 may have several configurations which are activated according to the condition. One may also adjust reportConfig 1003, or the measId 1002 list which links reporting to a measurement object. For instance, when a condition is met the measId list may be reconfigured to link a measurementObject with a different reportConfiguration. Also measObject 1001 may be adjusted for example to take into account new neighbor cells.

It should be appreciated that when satellites have a low altitude in the case of LEO satellites, the differential delay between client devices 300 in the same non-terrestrial network node device cell may be significant. The measurement gap configured to a particular client device 300 should be such that it will be able to measure the next non-terrestrial network node device.

The disclosure herein can also be applied to client device HO between non-terrestrial network node device and terrestrial network node device.

Figure 11:
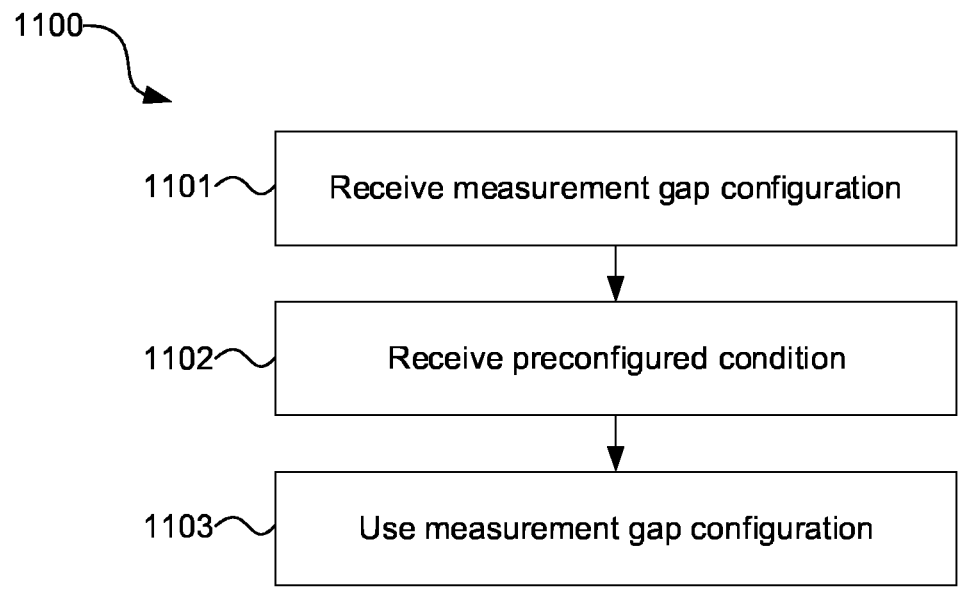
FIG. 11 illustrates another example embodiment of the subject matter described herein illustrating a flow chart of a method.

FIG. 11 shows an example embodiment of the subject matter described herein illustrating a method 1100 for measurement gap adaptation. The method 1100 may be performed by, for example, the client device 300.

According to an example embodiment, the method 1100 comprises receiving 1101 a measurement configuration from a first network node device.

The method 1100 may further comprise receiving 1102 a preconfigured condition for the measurement configuration from the first network node device.

The method 1100 may further comprise in response to the preconfigured condition for the measurement configuration being fulfilled, using 1103 the measurement configuration.

Figure 12:
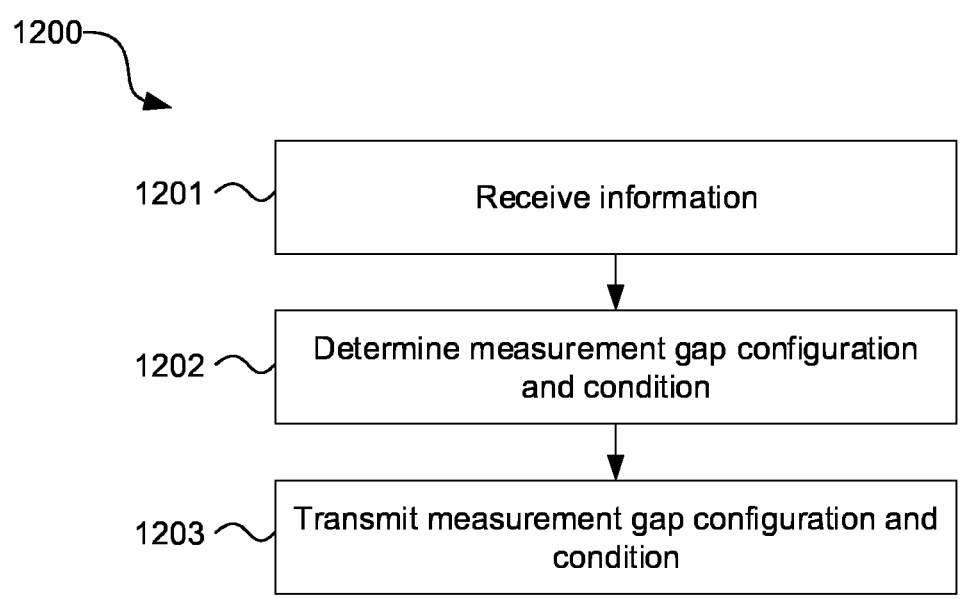
FIG. 12 illustrates another example embodiment of the subject matter described herein illustrating a flow chart of another method.

FIG. 12 shows an example embodiment of the subject matter described herein illustrating a method 1200 for measurement gap adaptation. The method 1200 may be performed by, for example, the network node device 400.

According to an example embodiment, the method 1200 comprises receiving 1201 an information related to a client device and a second network node device.

The method 1200 may further comprise, based on the information related to a client device and a second network node device, determining 1202 a measurement configuration and a preconfigured condition for the measurement configuration.

The method 1200 may further comprise transmitting 1203 the measurement configuration and the preconfigured condition for the measurement configuration to the client device.

It is to be understood that the order in which operations 1101-1103 and/or 1201-1203 are performed, may vary from the example embodiment depicted in FIGS. 11 and 12.

The method 1100 may be performed by the client device 300 of FIG. 3. The method 1200 may be performed by the network node device 400 of FIG. 4. Further features of the methods 1100, 1200 directly result from the functionalities and parameters of the client device 300 and/or the network node device 400. The methods 1100, 1200 can be performed by computer program(s).

An apparatus may comprise means for performing any aspect of the method(s) described herein. According to an example embodiment, the means comprises at least one processor, and memory comprising program code, the at least one processor, and program code configured to, when executed by the at least one processor, cause performance of any aspect of the method.

At least some of the example embodiments described herein may avoid multiple RRC signaling for a single client device while still using measurement configurations that may optimize performance. When using RRC messaging, this could be necessary for every single client device in a cell, for every transition of a satellite.

The functionality described herein can be performed, at least in part, by one or more computer program product components such as software components. According to an example embodiment, the client device 300 and/or network node device 400 comprise a processor configured by the program code when executed to execute the example embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and Graphics Processing Units (CPUs).

Any range or device value given herein may be extended or altered without losing the effect sought. Also any example embodiment may be combined with another example embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one example embodiment or may relate to several example embodiments. The example embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the example embodiments described above may be combined with aspects of any of the other example embodiments described to form further example embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various example embodiments have been described above with a certain degree of particularity, or with reference to one or more individual example embodiments, those skilled in the art could make numerous alterations to the disclosed example embodiments without departing from the spirit or scope of this specification.

The invention claimed is:

1. A client device, comprising:
   at least one processor; and
   at least one memory including computer program code;
   the at least one memory and the computer program code configured to, with the at least one processor, cause the client device to:
   receive a measurement configuration from a first network node device;
   receive a preconfigured condition for the measurement configuration from the first network node device, the preconfigured condition comprising a timer relative to handover of the client device; and
   in response to the preconfigured condition for the measurement configuration being fulfilled, use the measurement configuration,
   wherein the measurement configuration comprises a measurement gap configuration and a measurement periodicity configuration,
   wherein the measurement gap configuration comprises a measurement gap length, a measurement gap periodicity and a measurement gap offset; and
   whereby the client device adjusts the measurement configuration with reduced radio resource signalling.

2. The client device according to claim 1, wherein the preconfigured condition for the measurement configuration comprises at least one of:
   a signal strength threshold value;
   a timing advance threshold value;
   a geolocation of the client device; or
   a signal received from the first network node device.

3. The client device according to claim 1, wherein the at least one memory and the computer program code are further configured to, with the at least one processor, cause the client device to:
   receive the measurement configuration and/or the preconfigured condition for the measurement configuration in a handover command indicating a handover from a second network node device to the first network node device; and
   perform a handover from the second network node device to the first network node device according to the handover command.

4. The client device according to claim 1, wherein the at least one memory and the computer program code are further configured to, with the at least one processor, cause the client device to:
   receive a reference signal from a third network node device using the measurement configuration.

5. A method for a client device, the method comprising:
   receiving a measurement configuration from a first network node device;
   receiving a preconfigured condition for the measurement configuration from the first network node device, the preconfigured condition comprising a timer relative to handover of the client device; and
   in response to the preconfigured condition for the measurement configuration being fulfilled, using the measurement configuration,
   wherein the measurement configuration comprises a measurement gap configuration and/or a measurement periodicity configuration, and
   wherein the measurement gap configuration comprises a measurement gap length, a measurement gap periodicity and a measurement gap offset; and
   whereby the measurement configuration is adjusted with reduced radio resource signalling.

6. The method according to claim 5, wherein the preconfigured condition for the measurement configuration comprises at least one of:
   a signal strength threshold value;
   a timing advance threshold value;
   a geolocation of the client device; or
   a signal received from the first network node device.

7. A non-transitory computer readable medium storing a program of instructions, execution of which by a processor configures an apparatus to at least perform the method according to claim 5.

8. A network node device, comprising:
   at least one processor; and
   at least one memory including computer program code;
   the at least one memory and the computer program code configured to, with the at least one processor, cause the network node device to:
   receive an information related to a client device and a second network node device;
   based on the information related to the client device and a second network node device, determine a measurement configuration and a preconfigured condition for the measurement configuration,
   wherein the information related to the client device and the second network node device comprises a length of stay of the client device, at least one beam geometry used between the client device and the second network node device, and mobility profile of the client device;
   adjust the measurement configuration based on Timing Advance (TA); and
   transmit the measurement configuration and the preconfigured condition for the measurement configuration to the client device.

9. The network node device according to claim 8, wherein the at least one memory and the computer program code are further configured to, with the at least one processor, cause the network node device to:
- in response to the preconfigured condition for the measurement configuration being fulfilled, use the measurement configuration.

10. The network node device according to claim 9, wherein the at least one memory and the computer program code are further configured to, with the at least one processor, cause the network node device to:
- in response to the preconfigured condition for the measurement configuration being fulfilled, adjust scheduling of the client device in accordance with the measurement configuration.

11. The network node device according to claim 8, wherein the at least one memory and the computer program code are further configured to, with the at least one processor, cause the network node device to:
- receive the information related to the client device and the second network node device from the client device or from the second network node device.

12. The network node device according to claim 8, wherein the information related to the client device and the second network node device further comprises at least one of:
- at least one beam used between the client device and the second network node device; or
- a location of the client device.

13. The network node device according to claim 8, wherein the at least one memory and the computer program code are further configured to, with the at least one processor, cause the network node device to:
- transmit the measurement configuration and/or the preconfigured condition to the client device via the second network node device.

14. The network node device according to claim 8, wherein the at least one memory and the computer program code are further configured to, with the at least one processor, cause the network node device to:
- transmit the measurement configuration and/or the preconfigured condition to the client device in a handover command indicating a handover from the second network node device to the network node device.

* * * * *